United States Patent [19]

Hasse et al.

[11] 4,366,523

[45] Dec. 28, 1982

[54] ARRESTER WITH SPARK GAP

[75] Inventors: Peter Hasse, Neumankt; Johannes Wiesinger, Puchheim; Erich Pivit, Allmersbach, all of Fed. Rep. of Germany

[73] Assignee: AEG-Telefunken Aktiengesellschaft, Frankfurt and Berlin, Fed. Rep. of Germany

[21] Appl. No.: 257,423

[22] Filed: Apr. 24, 1981

[30] Foreign Application Priority Data

Apr. 26, 1980 [DE] Fed. Rep. of Germany ....... 3016265

[51] Int. Cl.³ ............................................. H02H 9/06

[52] U.S. Cl. .................................... 361/120; 361/130; 313/204

[58] Field of Search ............... 361/117, 120, 121, 130; 313/231.1, 231.2, 204

[56] References Cited

U.S. PATENT DOCUMENTS

| | | | |
|---|---|---|---|
| Re. 25,739 | 3/1965 | Yonkers | 313/231.2 |
| 815,384 | 3/1906 | Shaw | 361/130 |
| 1,133,671 | 3/1915 | Shapples | 313/231.2 |
| 2,338,109 | 1/1944 | Green | 361/130 X |
| 3,454,811 | 7/1969 | Scudner, Jr. | |
| 3,898,533 | 8/1975 | Scudner, Jr. | 313/204 X |

FOREIGN PATENT DOCUMENTS

| | | |
|---|---|---|
| 739028 | 9/1943 | Fed. Rep. of Germany . |
| 922724 | 1/1955 | Fed. Rep. of Germany . |
| 1113741 | 9/1961 | Fed. Rep. of Germany . |
| 1763187 | 7/1972 | Fed. Rep. of Germany . |
| 2149599 | 3/1973 | France . |

*Primary Examiner*—Reinhard J. Eisenzopf
*Attorney, Agent, or Firm*—Spencer & Kaye

[57] ABSTRACT

In an overvoltage arrester composed of two electrodes each presenting a side wall and an end wall transverse to the side wall and whose perimeter is bordered by the side wall, the electrodes being spaced apart to define a spark gap and with their end walls facing one another, and an insulating member interposed between the end walls of the two electrodes, the insulating member is dimensioned to protrude laterally beyond the perimeter of the end face of at least one electrode for causing the initiation of an arc to generate a sliding arc discharge following a curved path around the laterally protruding part of the insulating member.

13 Claims, 2 Drawing Figures

ARRESTER WITH SPARK GAP

BACKGROUND OF THE INVENTION

The present invention relates to an overvoltage arrester, particularly for limiting overvoltages in low-voltage systems and for the lightning protected coupling of electrochemically separated circuits, the arrestor including at least one spark gap delimited between two spaced electrodes, an insulating member being disposed between facing surfaces of the spaced electrodes.

In such arrestors, which are disclosed, for example, in German Offenlegungsschrift [Laid-open Applications] Nos. 2,337,734 and 2,627,648, the electrodes are preferably planar, disc-shaped electrodes whose flat end faces are kept apart by the insulating layer, and the flashover, or arc-over, path is formed in the external region either between the cylindrical faces of the electrodes, or between the cylindrical face of the one electrode and the end face of the other electrode. The advantage of such an arrester is that the energy created during arc-over can be quickly dissipated and thus the danger of explosion is eliminated. Its drawback, however, is the not quite optimum quenching behavior for currents following flashover.

It has also been proposed, as described in German Application No. 2,934,236.7 and corresponding copending U.S. application Ser. No. 179,706 filed by us on Aug. 20, 1980 to have the region of spark discharge followed by a chamber whose walls contain an insulating material which emits a quenching gas, normally held in the insulating material, when under the influence of heat, the walls being provided with an exit opening through which the gases formed during the spark discharge can escape. Although this arrester is a significant improvement over the first-mentioned arrestor, its useful life is limited by the consumption of those electrode parts which form the arc-over point during firing or by consumption of the solid-phase gas insulating body.

It has furthermore been proposed, as disclosed in German Application No. 2,934,238.9, to provide an insulating layer containing a quenching gas in a spark gap whose point of arc-over is formed by the side faces of the electrodes, outside of an insulating layer provided to keep apart the electrode end faces. This design has also been found satisfactory but the above shortcomings apply here as well.

SUMMARY OF THE INVENTION

It is therefore an object of the present invention to provide an inexpensive arrestor with improved quenching behavior and increased useful life for mains aftercurrents.

The above and other objects are achieved, according to the invention, in an overvoltage arrester composed of two electrodes each presenting a side wall and an end wall transverse to the side wall and whose perimeter is bordered by the side wall, the electrodes being spaced apart to define a spark gap and with their end walls facing one another, and an insulating member interposed between the end walls of the two electrodes, by dimensioning the insulating member to protrude laterally beyond the perimeter of the end face of at least one electrode for causing the initiation of an arc to generate a sliding arc discharge following a curved path around the laterally protruding part of the insulating member.

The arrester according to the invention has the advantages that firing of the arc, following approximately the shortest field lines in the air gap, takes place on a curved path, namely around the insulating member. This curved arc is not stable, since it does not correspond to the field lines, particularly in the region around the insulating member. It will therefore tend to find a local path in which the charge carriers flowing between the electrodes can follow the field lines which are entirely in the air. Thus, the arc will travel away from the point of firing and build up between the electrode faces which are spaced somewhat further apart. Thus, the sensitive zone is protected against consumption of the electrodes and also, of the insulating material. The spark gap thus has useful longer life. Due to the fact that the arc is shunted to an area which is not interfered with by the insulating member, the arc is, firstly, quenched more easily and, secondly, cooled more efficiently.

DESCRIPTION OF THE PREFERRED EMBODIMENTS

Figure 1:
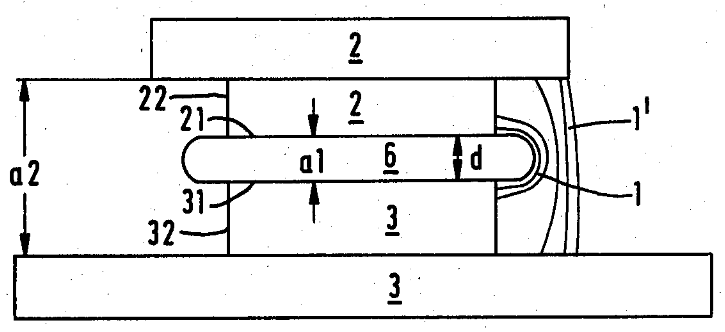
FIG. 1 is a simplified elevational view of a preferred embodiment of the structure forming a spark gap in arrester according to the invention.

FIG. 1 shows an embodiment of an arrester according to the invention composed of two planar disk electrodes 2, and 3 having side faces 22 and 32 and spaced apart at end faces 21 and 31 by means of a likewise planar disk insulator member 6 to define a spark gap. Each electrode undergoes an abrupt change in diameter at a location where the electrodes are spaced apart from one another by a distance a2 which is greater than the spacing a1 between faces 21 and 31, spacing a1 being equal to the thickness d of member 6. The insulating member 6 protrudes on all sides laterally beyond the edges of the electrode end faces 21 and 31, so that arc-over occurs in the form of a curved arc 1 which however, will soon travel, as described above, outwardly into the region 1'. The shift is supported by magnetic forces in the arc current.

If, moreover, the insulating member contains a trapped quenching gas which is emitted under the influence of heat, the internal gas pressure of the firing arc is additionally augmented by the release of the quenching gas so that traveling of the arc toward the outside is supported. When thus shunted to the edge of the electrodes, the arc can be cooled and quenched more easily.

Consumption, i.e. erosion, of the electrodes at their external zones does not interfere with the operation of the spark gap since there is sufficient material available in these zones. However, the inner zones of the two electrodes between which the arc is triggered and which are very sensitive to consumption, are protected due to the rapid departure of the arc therefrom after firing, thus providing a much longer service life for the arrester.

Figure 2:
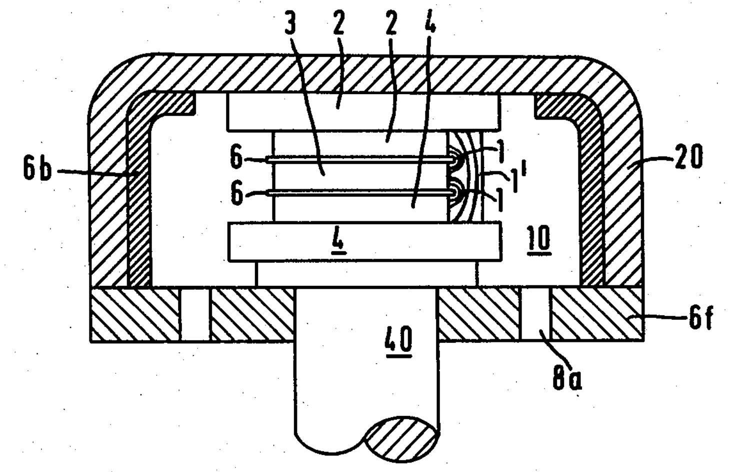
FIG. 2 is a cross-sectional view of a further preferred embodiment of the invention.

FIG. 2 shows a further embodiment of the invention presenting a dual spark gap formed of planar disk electrodes 2, 3, and 4 and two insulating members 6 interposed therebetween. The electrodes all have the same basic diameter and only the two outer electrodes 2 and 4 undergo an abrupt change in diameter at a distance from one another which is greater than the spacing between their end faces contacting members 6. According to the invention, the insulating members extend laterally beyond the adjacent frontal faces of the electrodes in that they each have a diameter which exceeds the basic diameters of the electrodes by about twice the thickness, d, of each insulating piece. Thus, each member 6 can project beyond the sidewalls of each associated electrode by a distance equal to the dimension d.

A chamber 10 is arranged around the electrode arrangement, the walls of the chamber being formed of a conductive hollow cylinder 20 connected with large diameter part of the upper outer electrode 2, and a flat disk 6*f* of insulating material. The lower outer electrode 4 is connected to an electrode extension 40 passing through disk 6*f*. The lower insulating material disk 6*f* which is fastened to the hollow cylinder 20 is provided with openings 8*a* through which the gases generated during the arc discharge can escape from the chamber 10.

The inside of the hollow cylinder 20 is partially lined with a layer of insulating material 6*b* which advantageously contains gas trapped in a solid phase like the insulating members 6.

This arrester arrangement according to the invention is of particular advantage since the two arcs 1 formed between the electrodes 3 and 4, and 2 and 3, respectively, which each extend in a greatly curved manner around the outer protrusions of the associated insulating pieces, combine practically immediately after firing into a common arc as a result of the electrical forces and this arc is urged outwardly as described above and burns substantially between the outer edges of the surfaces formed by the abrupt changes in diameter of the two outer electrodes 2 and 4.

Due to the fact that consumption in these edge zones does not interfere with the function of the spark gap and that the sensitive firing region is protected against excess consumption because the arc dwells in this area only during the initiation phase, this arrester is distinguished by a long service life, and good quenching behavior is realized in an uncomplicated manner. The service life is increased even further if metal alloys having a high resistance to arc-induced erosion are selected for the electrode material.

Practical embodiments of the invention can be constructed using, for example, Teflon or POM (polyoxymethylene), both having a vaporization temperature of about 300° C., achieved in the presence of an arc current of at least 300A, for members 6 and layer 6*b*, and a 20–80 copper-tungsten alloy for electrodes 2, 3 and 4. In a typical structure according to the invention, the electrodes can have a diameter of 20–30 mm and a thickness, in their small diameter portion, of 3–5 mm. Insulating members 6 can have a thickness of 0.5 mm. Such an arrangement provides an insulation resistance of the order of 10 MΩ, a breakdown voltage of 1.5 KV and an arc discharge voltage of 30–50 V.

It will be understood that the above description of the present invention is susceptible to various modifications, changes and adaptations, and the same are intended to be comprehended within the meaning and range of equivalents of the appended claims.

What is claimed is:

1. In an overvoltage arrester composed of two electrodes each presenting a side wall and an end wall transverse to the side wall and whose perimeter is borderd by the side wall, the electrodes being spaced apart to define a spark gap and with their end walls facing one another, and an insulating member interposed between the end walls of the two electrodes, the improvement wherein said insulating member is dimensioned to protrude laterally beyond the entire perimeter of said end wall of at least one said electrode for causing the initiation of an arc to generate a sliding arc discharge following a curved path around the laterally protruding part of said insulating member, said insulating member is of a material which emits a quenching gas under the influence of heat, each said electrode exhibits an abrupt change in diameter at a location spaced from its associated end wall, said electrodes present at the location of their abrupt change of diameter respective opposing electrode end faces spaced from one another by a distance which is greater than the spacing defined by said insulating member interposed between said end walls of said electrodes, and the perimeter of said end faces protrudes laterally beyond the perimeter of said insulating member.

2. Arrester as defined in claim 1 wherein said insulating member is dimensioned to protrude laterally beyond the perimeter of said at least one electrode end wall by a distance approximately of the order of magnitude of the spacing between said end walls or the thickness of said insulating member.

3. Arrester as defined in claim 1 or 2 wherein said electrodes define a plurality of spark gaps, and there is a plurality of said insulating members each located in a respective gap.

4. Arrester as defined in claim 1 or 2 wherein each said electrode and said insulating member has the form of a disc.

5. Arrester as defined in claim 1 or 2 wherein said electrodes and insulating member are arranged in axial symmetry with respect to one another.

6. Arrester as defined in claim 4 further comprising means defining a chamber surrounding the region of the arc discharge, said chamber having walls made of an insulating material which emits a quenching gas under the influence of heat and being provided with an exit opening through which the gases generated during the arc discharge can escape.

7. Arrester as defined in claim 6 wherein said chamber surrounds said electrodes and said insulating member in the form of a ring, and said chamber walls have the form of a hollow cylinder or a ring.

8. Arrester as defined in claim 7 wherein said chamber walls have the form of a hollow cylinder with an open end in which said exit opening is provided.

9. Arrester as defined in claim 7 wherein said chamber walls have the form of a hollow cylinder and said exit opening is constituted by at least one bore or slit in the side wall thereof.

10. Arrester as defined in claim 7 wherein said chamber walls have the form of a hollow cylinder with a closed bottom and said exit opening is constituted by at least one bore or slit in the closed bottom.

11. Arrester as defined in claim 6 wherein each said electrode and said insulating member has the form of a disc.

12. Arrester as defined in claim 6 wherein said electrodes and insulating member are arranged in axial symmetry with respect to one another.

13. Arrester as defined in claim 1 or 2 wherein said electrodes are made of metal alloys having a high resistance to erosion in the presence of an arc.

* * * * *